US007302538B2

(12) United States Patent
Liu et al.

(10) Patent No.: US 7,302,538 B2
(45) Date of Patent: Nov. 27, 2007

(54) STORAGE MEDIUM FOR DATA BACKUP AND METHOD FOR THE SAME

(75) Inventors: Wen-Chien Liu, Hsinchu (TW); Pei-Chun Wen, Taipei (TW)

(73) Assignee: Ulead Systems, Inc., Taipei (TW)

( * ) Notice: Subject to any disclaimer, the term of this patent is extended or adjusted under 35 U.S.C. 154(b) by 381 days.

(21) Appl. No.: 10/967,034

(22) Filed: Oct. 15, 2004

(65) Prior Publication Data
US 2006/0083127 A1    Apr. 20, 2006

(51) Int. Cl.
*G06F 12/16* (2006.01)
(52) U.S. Cl. .................... 711/162; 711/161; 707/204
(58) Field of Classification Search ............... 711/161, 711/162; 707/204
See application file for complete search history.

(56) References Cited

U.S. PATENT DOCUMENTS

| 5,812,519 | A | 9/1998 | Kawamura et al. ....... 369/275.1 |
| 6,952,479 | B2 * | 10/2005 | Shavit et al. ............... 380/201 |
| 2002/0178173 | A1 * | 11/2002 | Chefalas et al. ............ 707/200 |
| 2004/0181641 | A1 * | 9/2004 | Nguyen et al. ............. 711/162 |
| 2005/0081006 | A1 * | 4/2005 | Shackelford et al. ....... 711/162 |

FOREIGN PATENT DOCUMENTS

| JP | 2004 185679 | 7/2004 |
| TW | 575837 | 2/2004 |

OTHER PUBLICATIONS

Osta, Optical Storage Technology Association, "CD-R & CD-RW Questions & Answers," OSTA-4, Revision 2.00, Jul. 15, 1997.

Pioneer—DVD White Paper, "An Introduction to DVD Recordable (DVD-R)," Pioneer New Media Technologies, Inc., Long Beach, California, Jan. 31, 2001.

Pioneer—DVD White Paper, "DVD-R Authoring vs. General Media: What's the Difference?," Pioneer New Media Technologies, Inc., Long Beach, California, Jan. 31, 2001.

Pioneer—DVD White Paper, "An Introduction to DVD-RW," Pioneer New Media Technologies, Inc., Long Beach, California, Feb. 8, 2001.

ECMA, Standardizing Information and Communication Systems, "80 mm (1,23 Gbytes per side) and 120 mm (3,95 Gbytes per side) DVD-Recordable Disk (DVD-R)," Standard ECMA-279, Geneva, Switzerland, Dec. 1998.

English translation of Office Actions dated May 5, 2006 and Mar. 15, 2007, and Summary of Applicant's Rebuttal Arguments, for Taiwan Patent Application No. 093133318. (3 pages).

* cited by examiner

Primary Examiner—Jack Lane
(74) Attorney, Agent, or Firm—Kusner & Jaffe

(57) ABSTRACT

The present invention discloses a writable storage medium with backup module contained therein to backup important data. With this writable storage medium, the user could automatically duplicate the data in the computer or the peripheral devices coupled thereto into the writable storage medium. All the user has to do is designating the target data to be duplicated, and the backup module will finish the rest. No installation of software is required. The user may recover any part of the target from the writable storage medium if the computer is crash or some important files are deleted accidentally. Hence, a simple and direct way for data backup is provided by the present invention.

29 Claims, 2 Drawing Sheets

STORAGE MEDIUM FOR DATA BACKUP AND METHOD FOR THE SAME

FIELD OF THE INVENTION

The present invention is related to the mechanism of data backup, especially to a writable storage medium with an embedded backup module for data backup.

BACKGROUND OF THE INVENTION

With progress of computer technology, users are provided with a greater number of functions. People nowadays are more reliant on computers, utilizing them to accomplish almost everything from everyday needs to work-related matters. With majority of the population relying on computers, the data stored in the computer become very important.

Sometimes, the computer will crash while working on something very important. In such inevitable situation, the hard drive may be damaged, and therefore some important data would be lost. In light of this, users should be provided with a backup mechanism to safeguard their work.

Conventionally, the users will use backup software with a secondary storage medium to back up data, such as a DVD/CD. If the users want to back up data in a computer, they have to install backup software first then run this software to back up data in the computer. To back up data into a storage medium such as a disc, the users will need a burner and burning software. In these situations, two kinds of software must be installed.

For many users, installing software is never an easy task. In addition, using back up and burning programs are complicated that ordinary users might feel frustrated when backing up data. When faced with these frustrations, the users may just disregard the back up process. Therefore, there will be a risk that data would be lost when the computer crashes and no backup data to recover.

Besides backing up files, when people use digital cameras to take pictures or videos, they may want to share them immediately. In the conventional way, photos in the digital camera need to be transferred first to the computer first and then burned onto a disc. Here, the same frustration may happen because installing software or transferring photos to the computer is not as easy as it seems.

Therefore, a direct and simple solution should be provided for ordinary users to duplicate their data from the computer or a peripheral device to a secondary storage medium, such as a disc.

SUMMARY OF THE INVENTION

In view of the aforementioned problems, the present invention thus provides a simple and direct way to backup data in the computer or its peripheral devices. With the storage medium and method of the present invention, any user with common knowledge of computer could keep their important data or pictures in a safe and portable storage medium, such as a DVD or a CD. All the users have to do is to insert a storage medium with an embedded backup module into the disc drive of the computer, followed by designating the target data that will be under backup, and the backup module would process the rest. Even if the target data or the backup schedule is predetermined, the users would just have to insert the storage medium or merely let it stay in the disc drive all along.

According to one purpose of the present invention, a writable storage medium is disclosed. The writable storage medium comprises a writable/rewritable data storing area and a backup module. The writable/rewritable data storing area is used for storing digital data, and the backup module is embedded in the writable medium. The backup module would duplicate target data into the writable/rewritable data storing area, and be activated automatically while the writable storage medium is coupled to a computer. The writable storage medium may be a writable DVD, a rewritable DVD, a writable CD, a rewritable CD, or a blue-ray disc.

According to another purpose of the present invention, a method for data backup is disclosed. The steps of this method comprise providing a writable storage medium with a backup module contained therein. The next step is to feed the writable storage medium into a computer including an operation system. Subsequently, the backup module is invoked by the operation system of the computer. Then, the data is duplicated by the backup module into the writable storage medium. The writable storage medium may be a writable DVD, a rewritable DVD, a writable CD, a rewritable CD, or a blue-ray disc.

According to yet another purpose of the present invention, a writable storage medium is disclosed. The writable storage medium comprises a writable/rewritable data storing area and a move module. The writable/rewritable data storing area is used for storing digital data, and the move module is embedded in the writable medium. The move module would move target data into the writable/rewritable data storing area, and be activated automatically while the writable storage medium is coupled to a computer. The writable storage medium may be a writable DVD, a rewritable DVD, a writable CD, a rewritable CD, or a blue-ray disc.

According to still another purpose of the present invention, a method for moving data is disclosed. The steps of this method comprise providing a writable storage medium with a move module contained therein. The next step is to feed the writable storage medium into a computer including an operation system. Subsequently, the move module is invoked by the operation system of the computer. Then, the data is moved by the move module into the writable storage medium. The writable storage medium may be a writable DVD, a rewritable DVD, a writable CD, a rewritable CD, or a blue-ray disc.

DETAILED DESCRIPTION OF THE PREFERRED EMBODIMENT

The present invention is described with the preferred embodiments and accompanying drawings. It should be appreciated that all the embodiments are merely used for illustration. Hence, the present invention can also be applied to various embodiments other than the preferred embodiments. Besides, the present invention is not limited to any embodiment but to the appending claims and their equivalents.

Figure 1:
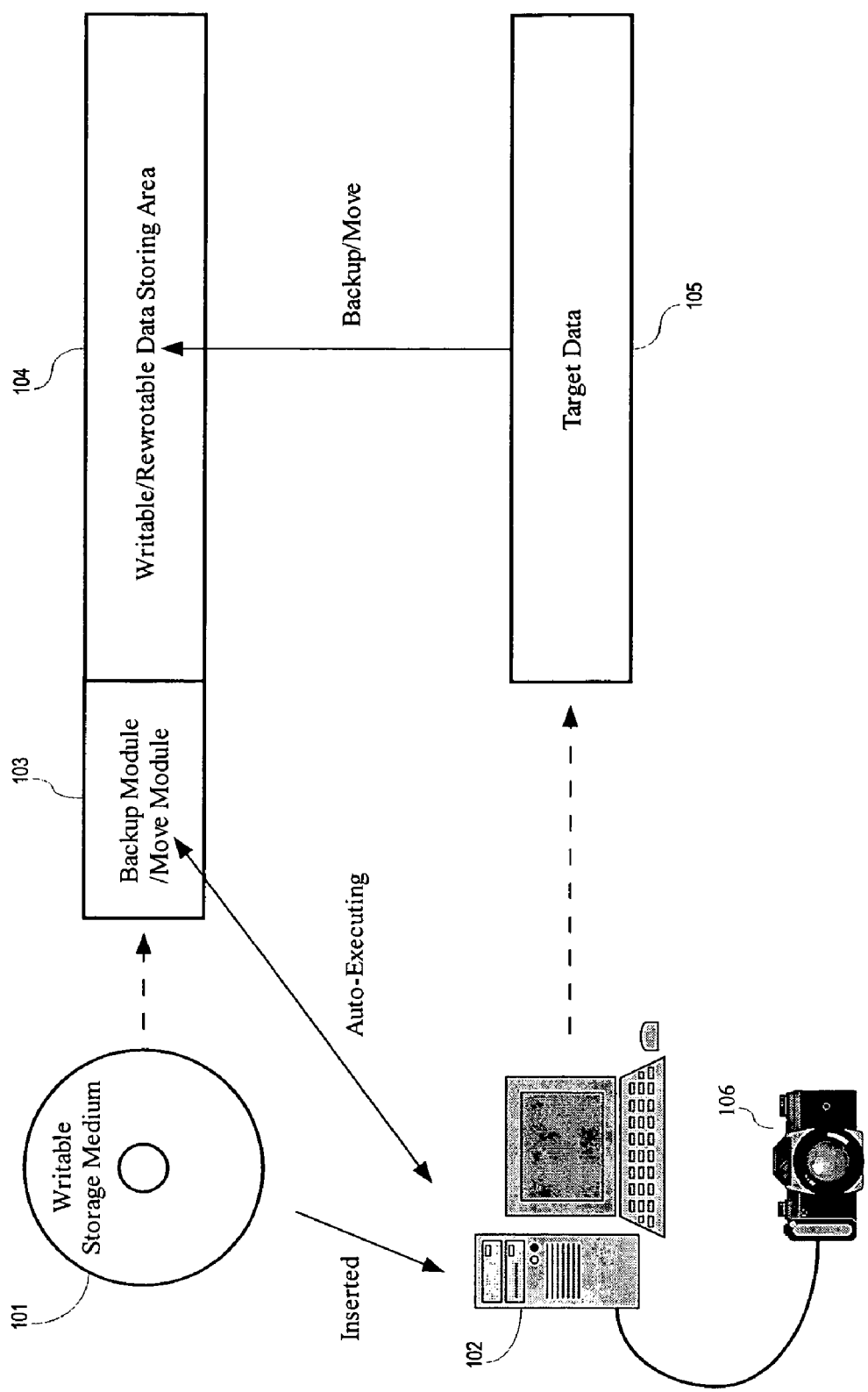
FIG. 1 is the block diagram of one embodiment according to the present invention.
Figure 2:
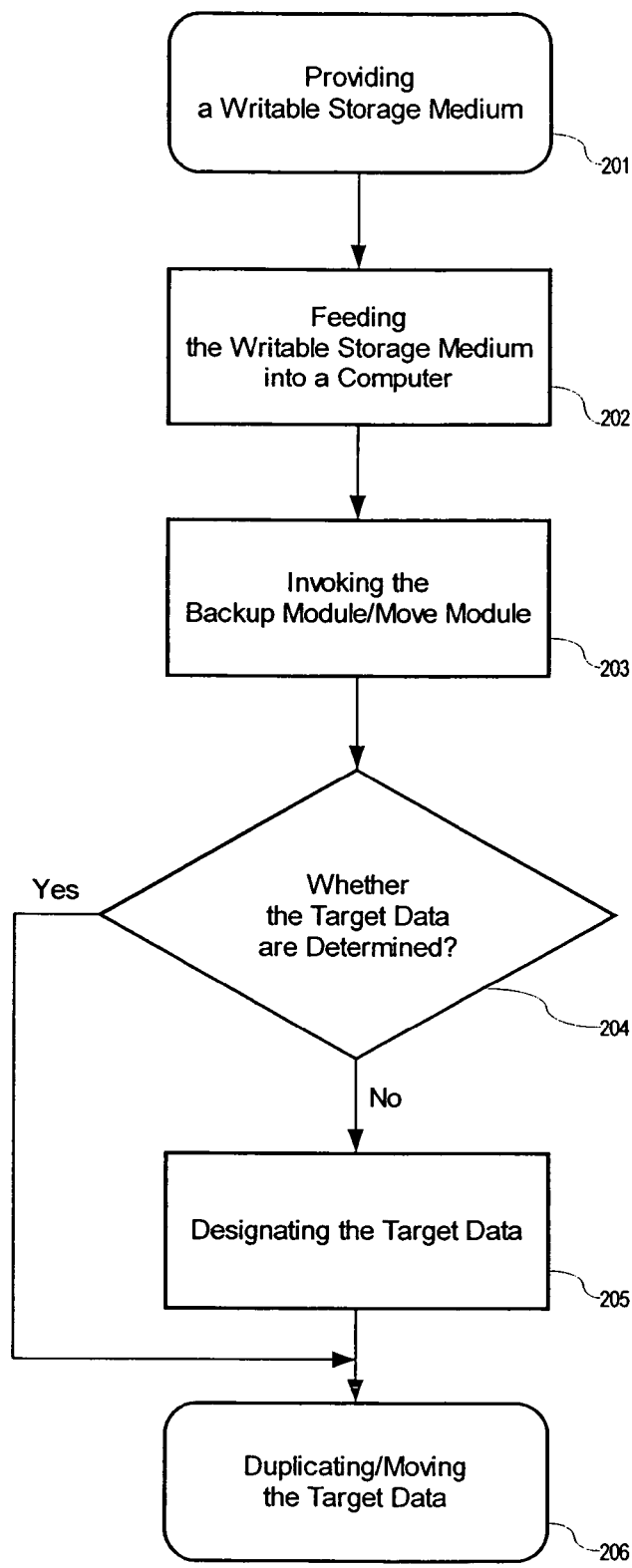
FIG. 2 is the flow chart of the method according to the present invention.

Referring to FIG. 1, one embodiment of present invention is illustrated. The writable storage medium 101 mainly comprises two parts, which are backup module 103 and writable/rewritable data storing area 104. The backup module 103 may be the software or merely a list of computer-executable instructions stored in the writable storage medium 101, and the writable/rewritable data storing area 104 are applied to store certain digital data, such as the data stored in a hard disc. The backup module 103 and the writable/rewritable data storing area 104 may deposited in different sections of the writable storage medium 101. In the preferred embodiment of the present invention, the writable storage medium 101 may be a rewritable DVD or a writable DVD. Alternatively, the writable storage medium 101 may be a rewritable/writable CD or a blue-ray disc in other embodiments. It should be appreciated that the above types of the writable storage medium are cited merely for illustration instead of limitation, and the present invention includes various types of the writable storage medium 101. Besides, in order to describe the content of writable storage medium 101, a block constituted by two sections respectively corresponding to the backup module 103 and writable/rewritable data storing area 104 is introduced. With the same reason, the block 105 represents the target data stored in the computer 102.

As its name tells, the writable/rewritable data storing area 104 are capable of being writable or rewritable. However, in the preferred embodiment of the present invention, the section storing backup module 103 is inerasable or unchangeable. Nevertheless, in other embodiments of the present invention, the backup module 103 might still be updated by the user.

In one embodiment of the present invention, as the writable storage medium 101 is coupled to the computer 102, the backup module 103 stored in the writable storage medium 101 would be automatically activated. The coupling between the writable storage medium 101 and the computer 102 may be implemented by inserting the writable storage medium (a rewritable DVD) 101 into the DVD-RW drive of the computer 102. To automatically activate the backup module 103, an auto-run file could be provided for the operation system of the computer 102 to execute specific executable file (such as backup.exe or its equivalents) of the backup module 103. For example, the Windows of Microsoft Corporation would accept the file named "autorun.inf" in a DVD or a CD, and automatically execute the instructions therein.

In the first time the backup module 103 is executed in that computer 102 or the target data are not set yet, the user would be requested to designate the target data 105. Additionally, the user may select the target data which have been modified within a predetermined period, thereafter, the target data during such period would be processed only. In other words, the backup module 103 merely backup the designated files whose last-modified time code representing the time falling within that predetermined period. Namely, the target file includes a modified code that indicates the lately modified time of the file. The target data 105 then would be duplicated into the writable/rewritable data storing area 104 for backup. Typically, the target data include the content in specific folders or even certain whole discs. Moreover, if a peripheral device is coupled to the computer 102, the data therein may also be included in the target data 105. For example, a digital camera 106 is linked to the computer 102, and the data such as pictures in digital format as image files stored in the built-in memory or the memory card inserted therein may be designated as one part of the target data. The peripheral device may still include a mobile phone, a personal digital assistant, a video camera, or a CD-ROM drive, a CD-RW drive, a DVD-ROM drive, a DVD-RW drive, or a card reader. It should be appreciated that the types of peripheral device are various and the above instances are cited merely for illustration instead of limitation. The present invention comprises all kinds of peripheral device which is capable of storing digital files and transferring the digital files to the computer 102.

After the target data are designated or if the target data are predetermined, the automatically activated backup module 103 would duplicate the target data into the writable/rewritable data storing area as a backup version of the target data. Each backup version can be distinguished by its duplicated time. That is, maybe two different backup versions would have exactly the same content, and they are recorded as separate ones just because they are duplicated at different time. In one embodiment of the present invention, the backup module 103 may maintain each backup version of the target data 105. Additionally, the backup module 103 may overwrite the old and existing backup version with the fresh backup version in other embodiment. The number of the backup versions could depend on the capacity of the writable/rewritable data storing area 104 of the writable storing medium 101, or on the demand of the user. The present invention should encompass all the aforementioned situations.

In one embodiment of the present invention, the user can determine the backup schedule and designate the target data in advance. The backup module 103 would automatically carry out the duplication of the designated target data according to the schedule. That is, the user merely determines when to backup and what to backup, and the backup module 103 would finish the rest. Hence, the user is provided with a simple and direct way to backup certain significant data stored in the computer 102 or in the peripheral device. The installation of software is not required, and most jobs are accomplished by the automatic backup module. Moreover, since the schedule is predetermined, the writable storage medium 101 may stay in the computer 102 all along and the backup module 103 would be automatically activated and then complete the backup.

With the writable storage medium 101 of the present invention, one can restore all or a part of the target data if they are accidentally damaged or deleted. Additionally, if more than one backup version has been kept, the user may select one of these backup versions to recover the target data. Thus, with the writable storage medium of the present invention, the target data could be saved in a reliable place as a backup through a direct and simple way.

Besides, in another embodiment of the present invention, the writable storage medium 101 may comprise a move module. The move module would move the target into the writable/rewritable data storing area 104 rather than copy them. In other words, the target data would be deleted after processed by the move module. The remaining characteristics of the writable storage medium with an embedded move module are similar to that of the aforementioned writable storage medium with an embedded backup module, so the redundant descriptions are omitted.

According to the other aspect of the present invention, a method for data backup is disclosed.

First, a writable storage medium is provided in step 201, and a backup module is contained therein. The backup module is capable of automatically duplicating specific data into the writable storage medium. In one embodiment of the present invention, the writable storage medium may be a writable DVD, a rewritable DVD, a writable CD, or a rewritable CD. It should be appreciated that the above-mentioned types are cited for illustration instead of limitation, and the present invention includes every possible type of the storage medium. Next, this writable storage medium is fed into the computer in step 202. For example, the writable storage medium, which is a rewritable DVD, is inserted into the DVD-RW drive of the computer. The computer has an operation system, such as Windows of Microsoft Corporation or Mac OS of Apple Computer Inc., or Linux compatible operation system. The Trade Mark of Windows, Mac OS and Linux are registered by Microsoft Corporation, Apple Computer Inc., and Linux Corporation, respectively. They are incorporated herein for reference and illustration only.

As the writable storage medium is fed into the computer, the backup module contained in the writable storage medium would be invoked by the operation system of the computer in step 203. Before duplication, the backup module may check whether or not the target data to be duplicated have been determined in step 204. If the target data have been determined, the backup module would duplicate the data into the writable storage medium in step 206. Otherwise, the target data must be designated first in step 205. In one embodiment, the target data may be designated by the user and include the data stored in the computer or the peripheral device coupled to the computer. Additionally, the user may also select a period, and the backup module would only backup the target data which have been modified during such period. For example, the data may be stored in certain hard discs or floppy discs of the computer, or stored in the memory card or built-in memory of the peripheral device. In one embodiment of the present invention, the peripheral device may be a digital camera, a mobile phone, a personal digital assistant, a video camera, a CD-ROM drive, a CD-RW, a DVD-ROM, a DVD-RW drive, or a card reader.

As illustrated above, the backup module would generate a backup version of the target data during each time of duplication, and the writable storage medium would maintain this backup version of target data. Since the capacity of the writable medium is limited, it is impossible to store all backup versions in single writable storage medium. Hence, there are various ways to be chosen. For example, the writable storage medium may merely keep the latest backup version of the target. Alternatively, the writable storage medium may store every backup version and more writable storage media would be requested if the capacity of that writable storage medium is run out. Preferably, the latest backup version must be stored in the writable storage medium, and the old backup versions are optional.

If a part or even all of the target data are damaged or deleted accidentally, the user is able to recover the target data from the writable storage medium. Thus, the target data could be kept in a safe place through a direct and simple way.

Furthermore, in another embodiment of the present invention, the writable storage medium provided in step 201 may contain a move module instead of a backup module. The move module would move the target file into the writable storage medium in step 206, that is, the original target data will be deleted after processed by the move module. The remaining steps are similar to the aforementioned steps and therefore are omitted.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

We claim:

1. A writable storage medium comprising:
   a writable/rewritable data storing area for storing digital data;
   a backup module embedded in said writable storage medium for duplicating target data into said writable/rewritable data storing area, wherein said backup module is automatically activated while said writable storage medium is coupled to a computer.

2. The writable storage medium as set forth in claim 1, wherein said target data are designated by a user.

3. The writable storage medium as set forth in claim 2, wherein said target data includes a modified code indicating a lately modified time which falls within a predetermined period set by said user.

4. The writable storage medium as set forth in claim 1, wherein said target data is stored in said computer.

5. The writable storage medium as set forth in claim 1, wherein a peripheral device is coupled to said computer, and said target data are stored in said peripheral device.

6. The writable storage medium as set forth in claim 5, wherein said peripheral device includes a digital camera, a mobile phone, a personal digital assistant, a video camera, a CD-ROM drive, CD-RW drive, a DVD-ROM drive, a DVD-RW drive, or a card reader.

7. The writable storage medium as set forth in claim 1, wherein a backup version of said target data is duplicated and stored whenever said backup module is activated, wherein said writable/rewritable data storing area contains at least one backup version of said target data.

8. The writable storage medium as set forth in claim 1, wherein a user determines a backup schedule and designates said target data, and said backup module automatically backups said designated target data according to said backup schedule.

9. The writable storage medium as set forth in claim 1, wherein said writable storage medium includes a writable DVD, a writable CD, a rewritable DVD, a rewritable CD, or a blue-ray disc.

10. The writable storage medium as set forth in claim 1, wherein said backup module is stored in an area other than said writable/rewritable data storing area.

11. A method for data backup comprising:
   providing a writable storage medium with a backup module contained therein;
   feeding said writable storage medium into a computer including an operation system;
   invoking said backup module by said operation system; and
   duplicating target data by said backup module into said writable storage medium.

12. The method as set forth in claim 11, further comprising following steps before duplicating said target data:
   checking whether said target data are determined; and
   designating said target data if said target data are not determined.

13. The method as set forth in claim 11, wherein said step of duplicating target data comprises:
   generating a backup version of said target data by said backup module; and
   storing said backup version in said writable storage medium.

14. The method as set forth in claim 13, wherein said writable storage medium maintains at least one version of said backup data.

15. The method as set forth in claim 11, wherein said writable storage medium includes a writable DVD, a rewritable DVD, a writable CD or a rewritable CD.

16. The method as set forth in claim 11, wherein said operation system includes Windows of Microsoft Corporation, Mac OS of Apple Computer Inc., or Linux compatible operation system.

17. The method as set forth in claim 11, wherein said target data are designated by a user.

18. The method as set forth in claim 17, wherein said target data includes a modified code indicating a lately modified time which falls within a predetermined period set by said user.

19. The method as set forth in claim 18, wherein said peripheral device includes a digital camera, a mobile phone, a personal digital assistant, a video camera, a CD-ROM drive, CD-RW, a DVD-ROM, a DVD-RW drive, or a card reader.

20. The method as set forth in claim 11, wherein said target data are stored in said computer or in a peripheral device coupled to said computer.

21. The method as set forth in claim 11, further comprising:
restoring a part of said backup data to recover said target data.

22. A writable storage medium comprising:
a writable/rewritable data storing area for storing digital data;
a move module embedded in said writable storage medium for moving target data into said writable/rewritable data storing area, wherein said move module is automatically activated while said writable storage medium is coupled to a computer.

23. The writable storage medium as set forth in claim 22, wherein said target data are stored in said computer or in a peripheral device coupled to said computer.

24. The writable storage medium as set forth in claim 22, wherein said writable storage medium includes a writable DVD, a writable CD, a rewritable DVD, a rewritable CD, or a blue-ray disc.

25. The writable storage medium as set forth in claim 22, wherein said move module is stored in an area other than said writable/rewritable data storing area.

26. A method for moving data comprising:
providing a writable storage medium with a move module contained therein;
feeding said writable storage medium into a computer including an operation system;
invoking said move module by said operation system; and
moving target data by said move module into said writable storage medium.

27. The method as set forth in claim 26, further comprising following steps before duplicating said target data:
checking whether said target data are determined; and
designating said target data if said target data are not determined.

28. The method as set forth in claim 26, wherein said writable storage medium includes a writable DVD, a rewritable DVD, a writable CD or a rewritable CD.

29. The method as set forth in claim 26, wherein said target data are stored in said computer or in a peripheral device coupled to said computer.

* * * * *